United States Patent
Hablot et al.

(10) Patent No.: US 12,398,303 B2
(45) Date of Patent: Aug. 26, 2025

(54) TWO-COMPONENT SOLVENTLESS ADHESIVE COMPOSITIONS FOR ADHESION TO METAL AND/OR METALLIZED SUBSTRATES

(71) Applicants: DOW GLOBAL TECHNOLOGIES LLC, Midland, MI (US); ROHM AND HAAS COMPANY, Collegeville, PA (US)

(72) Inventors: Elodie Hablot, Zurich (CH); Jie Wu, Lake Jackson, TX (US); Kalyan Sehanobish, Sanford, MI (US); Thorsten Schmidt, Richterswil (CH); Joseph J. Zupancic, Glen Ellyn, IL (US); Daniele Vinci, Lucerne (CH); Marco Frasconi, Fagnano Olona (IT); Tuoqi Li, Dallas, TX (US)

(73) Assignee: Arkema France, Puteaux (FR)

( * ) Notice: Subject to any disclaimer, the term of this patent is extended or adjusted under 35 U.S.C. 154(b) by 1046 days.

(21) Appl. No.: 16/958,695

(22) PCT Filed: Nov. 13, 2018

(86) PCT No.: PCT/US2018/060642
§ 371 (c)(1),
(2) Date: Jun. 27, 2020

(87) PCT Pub. No.: WO2019/133120
PCT Pub. Date: Jul. 4, 2019

(65) Prior Publication Data
US 2021/0009874 A1    Jan. 14, 2021

(30) Foreign Application Priority Data
Dec. 27, 2017   (IT) ................ 102017000149946

(51) Int. Cl.
| | | |
|---|---|---|
| C09J 175/08 | (2006.01) | |
| B32B 7/12 | (2006.01) | |
| B32B 15/04 | (2006.01) | |
| B32B 15/08 | (2006.01) | |
| C08G 18/32 | (2006.01) | |
| C08G 18/50 | (2006.01) | |
| C08G 18/76 | (2006.01) | |
| C09J 7/28 | (2018.01) | |
| C09J 11/08 | (2006.01) | |
| C09J 175/12 | (2006.01) | |

(52) U.S. Cl.
CPC .............. *C09J 175/08* (2013.01); *B32B 7/12* (2013.01); *B32B 15/04* (2013.01); *C08G 18/3275* (2013.01); *C08G 18/5021* (2013.01); *C08G 18/7671* (2013.01); *C09J 7/28* (2018.01); *C09J 175/12* (2013.01); *B32B 15/08* (2013.01); *C09J 11/08* (2013.01); *C09J 2301/408* (2020.08); *C09J 2475/00* (2013.01); *C09J 2483/00* (2013.01)

(58) Field of Classification Search
CPC . C09J 175/08; C09J 7/28; C09J 175/12; C09J 11/08; C09J 2301/408; C09J 2475/00; C09J 2483/00; B32B 7/12; B32B 15/04; B32B 15/08; B32B 2250/02; B32B 5/022; B32B 5/024; B32B 27/10; B32B 27/12; B32B 27/36; B32B 2255/10; B32B 15/09; B32B 15/12; B32B 15/14; B32B 27/08; B32B 29/02; B32B 2255/205; B32B 2439/70; B32B 27/40; C08G 18/3275; C08G 18/5021; C08G 18/7671; C08G 18/48; C08G 18/7664
USPC ...................................... 428/425.8
See application file for complete search history.

(56) References Cited

U.S. PATENT DOCUMENTS

| | | | |
|---|---|---|---|
| 4,342,613 A | | 8/1982 | O'Leary et al. |
| 5,614,575 A | * | 3/1997 | Kotschwar ............... C08K 7/02 528/80 |
| 8,822,401 B2 | | 9/2014 | Mizusaki et al. |
| 11,014,334 B2 | * | 5/2021 | Schmidt ................. B32B 29/02 |

(Continued)

FOREIGN PATENT DOCUMENTS

| | | |
|---|---|---|
| EP | 1174026 B1 | 11/2005 |
| EP | 1772506 | 4/2007 |

(Continued)

OTHER PUBLICATIONS

Machine translation of WO 00/56831 A1 (Year: 2000).*
Chen, Siew Yin; et al., "Pectin as a rheology modifier: Origin, structure, commercial production and rheology", Dec. 24, 2016, Carbohydrate Polymers 161, p. 119 (Year: 2016).*

(Continued)

*Primary Examiner* — Callie E Shosho
*Assistant Examiner* — Steven A Rice
(74) *Attorney, Agent, or Firm* — Boyle Fredrickson S.C.

(57) ABSTRACT

Two-component solventless polyurethane adhesive compositions are disclosed comprising an isocyanate component comprising an isocyanate, and a polyol component comprising an amine-initiated polyol comprising two or more primary hydroxyl groups and a backbone incorporating tertiary amines, wherein the amine-initiated polyol comprises a functionality of from 2 to 12, a hydroxyl number of from 5 to 1,830, and a viscosity at 40° C. of from 500 to 20,000 mPa-s, and a silicone-based additive (e.g., an anti-foaming agent and/or a wetting agent). The adhesive compositions are formulated such that the isocyanate and polyol components can be applied to separate substrates prior to mixing. Laminate structures comprising the disclosed adhesive compositions and further comprising a metal or metallized substrate are also disclosed.

9 Claims, No Drawings

(56) References Cited

U.S. PATENT DOCUMENTS

| | | | |
|---|---|---|---|
| 11,041,100 B2* | 6/2021 | Vinci | C08G 18/3284 |
| 2002/0157789 A1 | 10/2002 | Imai et al. | |
| 2005/0163960 A1 | 7/2005 | Lapin | |
| 2006/0105187 A1 | 5/2006 | Simons, Jr. et al. | |
| 2010/0119821 A1* | 5/2010 | Uemura | B32B 27/38 |
| | | | 427/207.1 |
| 2010/0189937 A1 | 7/2010 | Ogawa et al. | |
| 2011/0098417 A1* | 4/2011 | Worley | C08G 18/4825 |
| | | | 525/380 |
| 2013/0255880 A1* | 10/2013 | Mahdi | C09J 175/04 |
| | | | 156/331.7 |
| 2015/0002080 A1 | 1/2015 | Lang | |
| 2016/0090515 A1 | 3/2016 | Roock et al. | |
| 2016/0369140 A1* | 12/2016 | Han | C08G 18/792 |
| 2017/0334183 A1 | 11/2017 | Kimura et al. | |
| 2021/0009876 A1 | 1/2021 | Hablot et al. | |
| 2021/0197523 A1* | 7/2021 | Schmidt | B32B 37/0053 |

FOREIGN PATENT DOCUMENTS

| | | | |
|---|---|---|---|
| WO | WO-0056831 A1 * | 9/2000 | C09K 3/12 |
| WO | 2007138096 | 12/2007 | |
| WO | WO-2013012699 A2 * | 1/2013 | C08G 18/3206 |
| WO | WO-2015153399 A1 * | 10/2015 | C08G 18/12 |
| WO | 2016152370 | 9/2016 | |
| WO | 2017/150290 A1 | 9/2017 | |
| WO | 2017196528 | 11/2017 | |
| WO | 2017196529 | 11/2017 | |
| WO | 2017196530 | 11/2017 | |
| WO | WO-2018140116 A1 * | 8/2018 | C08G 18/10 |

OTHER PUBLICATIONS

PCT/US2018/060642, Search Report and Written Opinion with a mailing date of Mar. 4, 2019.

* cited by examiner

TWO-COMPONENT SOLVENTLESS ADHESIVE COMPOSITIONS FOR ADHESION TO METAL AND/OR METALLIZED SUBSTRATES

REFERENCE TO RELATED APPLICATIONS

The present application claims the benefit of Italian Application No. 102017000149946, filed on Dec. 27, 2017.

FIELD OF THE DISCLOSURE

The instant disclosure relates to solventless adhesive compositions. The disclosed adhesive compositions comprise amine-initiated polyols providing for laminate structures having improved conversion efficiency, particularly when used in laminated structures having metal and/or metallized substrates therein, e.g., metallized PET films, aluminum films, etc.

In some embodiments, the adhesive compositions comprise an isocyanate component and a polyol component formulated to be applied to two substrates independently which are then brought together to mix and react the components of the adhesive composition. In particular, one component of the adhesive composition is configured to be uniformly applied to a surface of a first substrate and the other component of the adhesive composition is configured to be applied to a surface of a second substrate. The first and second substrates are subsequently brought together, thereby mixing and reacting the two components to form an adhesive between the first and second substrates. In this way, the adhesive can then be cured, thereby bonding the first and second substrates. The disclosed adhesive compositions include a silicone-based additive (e.g., an anti-foaming agent, a wetting agent, etc.) which improves laminate appearance at high lamination speeds, particularly when used with metal and/or metallized substrates.

BACKGROUND AND SUMMARY OF THE DISCLOSURE

Adhesive compositions are useful for a wide variety of purposes. For instance, adhesive compositions are used to bond together substrates such as polyethylene, polypropylene, polyester, polyamide, metal, metallized, paper, or cellophane to form composite films, i.e., laminates. The use of adhesives in different end-use applications is generally known. For example, adhesives can be used in the manufacture of film/film and film/foil laminates used in the packaging industry, especially for food packaging. Adhesives used in laminating applications, or "laminating adhesives," can be generally placed into three categories: solvent-based, water-based, and solventless. The performance of an adhesive varies by category and by the application in which the adhesive is applied.

Solventless laminating adhesives can be applied up to one hundred percent solids without either organic solvent or an aqueous carrier. Because no organic solvent or water has to be dried from the adhesive upon application, these adhesives can be run at high line speeds and are preferable in applications requiring quick adhesive application. Solvent and water-based laminating adhesives are limited by the rate at which the solvent or water can be effectively dried and removed from the laminate structure after application of the adhesive. For environmental, health, and safety reasons, laminating adhesives are preferably aqueous or solventless.

Within the category of solventless laminating adhesives, there are many varieties. One particular variety includes premixed, two-component, polyurethane-based laminating adhesives. Typically, a two-component polyurethane-based laminating adhesive includes a first component comprising an isocyanate-containing prepolymer and/or a polyisocyanate and a second component comprising a polyol. The prepolymer can be obtained by the reaction of excess isocyanate with a polyether and/or polyester containing two or more hydroxyl groups per molecule. The second component comprises a polyether and/or polyester initiated with two or more hydroxyl groups per molecule. The two components are combined in a predetermined ratio, or "premixed," and then applied on a first substrate ("carrier web"). The first substrate is then brought together with a second substrate to form a laminate structure.

Additional layers of substrate can be added to the structure with additional layers of adhesive composition located between each successive substrate. The adhesive is then cured, either at room temperature or elevated temperature, thereby bonding the substrates together.

Further processing of the laminate structure depends upon the curing speed of the adhesive. The curing speed of the adhesive is indicated by the time in which the mechanical bond between the laminated substrates takes to become sufficient to allow for further processing and the laminate is in compliance with applicable regulations (e.g., food contact regulations). Slow curing speed results in lower conversion efficiency. Premixed two-component solventless laminating adhesives, compared to traditional solvent-containing adhesives, exhibit weak initial bonds and slow curing speed. The general trend in the converting industry is towards faster curing laminating adhesives. Faster curing improves the operational efficiency for converters. Specifically, quickly moving finished products out of a warehouse increases production capacity and flexibility for handling last minute orders (e.g., retailer promotional campaigns). In order to increase operational efficiency, an adhesive composition with a reactivity much higher than existing adhesive compositions should be used to form laminates. However, such adhesive compositions have demonstrated limitations when used in laminate structures comprising metal and/or metallized substrates. At relatively-high line speeds (e.g., in excess of 250 m/min), defects in the produced laminates can be visually observed. The defects are attributable to, inter alia, wettability failures and air entrainment during the lamination process.

Accordingly, two-component solventless polyurethane-based laminating adhesive compositions with improved bond strength, faster curing speeds, and enhanced adhesion to metal and/or metallized substrates are desirable.

Two-component solventless polyurethane adhesive compositions are disclosed. The disclosed adhesive compositions are particularly suitable for use in laminate structures comprising a metal or metallized substrate. In some embodiments, the solventless adhesive compositions include an isocyanate component including an isocyanate. The isocyanate can be selected from the group consisting of an aromatic isocyanate, an aliphatic isocyanate, and combinations thereof. The solventless adhesive compositions further include a polyol component including a highly-reactive amine-initiated polyol and a silicone-based additive. The amine-initiated polyol can further comprise a functionality of from about 2 to about 12, a hydroxyl number of from about 5 to about 1,830, and a molecular weight of from about 500 to about 20,000. The silicone-based additive can be an anti-foaming agent, a wetting agent, or a combination thereof.

The disclosed adhesive compositions exhibit fast curing rates relative to existing two-component solventless adhesive compositions when used in laminate structures including metal and/or metallized substrates. Because the disclosed adhesive compositions are formulated to be more highly reactive and exhibit faster curing rates than existing adhesive compositions, they are not ideally suited for use with existing adhesive application apparatuses. This is because the two components react very quickly, causing the adhesive to gel and be unfit for application to a substrate. For this reason, the disclosed adhesive compositions are formulated such that the isocyanate and polyol components are applied separately on two different substrates, instead of being premixed and applied on a carrier web.

In particular, the disclosed adhesive compositions are formulated such the isocyanate component can be uniformly applied to a surface of a first substrate and the polyol component can be applied to a surface of a second substrate. The surface of the first substrate is then brought into contact with the surface of the second substrate to mix and react the two components, thereby forming a laminate. The adhesive composition is then curable.

DETAILED DESCRIPTION OF THE DISCLOSURE

The two-component solventless adhesive composition according to this disclosure comprises an isocyanate component and a polyol component, as discussed above.

Isocyanate Component

In some embodiments, the isocyanate component comprises an isocyanate blend which includes two or more isocyanate blended together. The isocyanates can be selected from the group consisting of an isocyanate prepolymer, an isocyanate monomer, a polyisocyanate (e.g., dimers, trimers, etc.), and combinations of two or more thereof. As used herein, a "polyisocyanate" is any compound that contains two or more isocyanate groups. The isocyanate prepolymer is the reaction product of reactants comprising an isocyanate and a polyol. As used herein, the "isocyanate prepolymer" can be a polyisocyanate itself.

In some embodiments, the isocyanate comprises a functionality of from 1.5 to 10, or from 1.8 to 5, or from 2 to 3. As used with respect to the isocyanate component, "functionality" refers to the number of hydroxyl reactive sites per molecule. Compounds having isocyanate groups, such as the isocyanate component, may be characterized by the parameter "% NCO," which is the amount of isocyanate groups by weight based on the weight of the compound. The parameter % NCO is measured by the method of ASTM D 2572-97 (2010). The disclosed isocyanate component has a % NCO of at least 3%, or at least 6%, or at least 10%. In some embodiments, the isocyanate component has a % NCO not to exceed 25%, or 18%, or 14%.

Further, the isocyanate comprises a free monomer content of from 0 to 50%, or from 5 to 40%, or from 10 to 30%. Still further, the at least one isocyanate comprises a molecular weight of from 200 to 3,000 g/mol, or from 300 to 2,000 g/mol, or from 500 to 1,000 g/mol. Even further, the isocyanate component has viscosity at 25° C. of from 300 to 40,000 mPa·s, or from 500 to 20,000 mPa·s, or from 1,000 to 10,000 mPa·s, as measured by the method of ASTM D2196.

In some embodiments, the isocyanate of the isocyanate component can be selected from the group consisting of an aromatic isocyanate, an aliphatic isocyanate, a cycloaliphatic isocyanate, and combinations thereof. An "aromatic polyisocyanate" is an isocyanate that contains one or more aromatic rings. An "aliphatic polyisocyanate" contains no aromatic rings. A "cycloaliphatic polyisocyanate" is a subset of aliphatic polyisocyanates, wherein the chemical chain is ring-structured.

Examples of suitable aromatic isocyanates suitable for use according to the disclosure include, but are not limited to, isomers of methylene diphenyl diisocyanate ("MDI"), such as 4,4'-MDI, 2,2'-MDI and 2,4'-MDI, isomers of toluene-diisocyanate ("TDI") such as 2,4-TDI, 2,6-TDI, isomers of naphthalene-diisocyanate ("NDI") such as 1,5-NDI, and combinations of two or more thereof. Preferred are isomers of MDI, particularly a mixture of 4,4'-MDI and 2,4'-MDI (i.e., liquid MDI) or 4,4'-MDI (i.e., solid MDI).

Examples of suitable aliphatic and cycloaliphatic isocyanates suitable for use according to the disclosure include, but are not limited to, isomers of hexamethylene diisocyanate ("HDI"), isomers of isophorone diisocyanate ("IPDI"), isomers of xylene diisocyanate ("XDI"), isomers of norbornane diisocyanate ("NBDI"), isomers of tetramethylxylylene diisocyanate ("TMXDI"), and combinations thereof.

The amount of the isocyanate in the adhesive composition is, by weight based on the weight of the adhesive composition (i.e., the total weight of the isocyanate component and the polyol component), at least 5 wt %, or at least 10 wt %, or at least 20 wt %. The amount of the isocyanate in the adhesive composition is, by weight based on the weight of the adhesive composition, not to exceed 100 wt %, or not to exceed 95 wt %, or not to exceed 90 wt %.

The isocyanate component can further comprise other constituents commonly known to those of ordinary skill in the art.

Polyol Component

In some embodiments, the polyol component comprises a highly-reactive amine-initiated polyol and a silicone-based additive.

Amine-Initiated Polyol

Inclusion of the amine-initiated polyol in the polyol component provides for higher reactivity and faster curing than traditional polyols used in existing two component solventless adhesive compositions. The amine-initiated polyol comprises primary hydroxyl groups and a backbone incorporating at least one tertiary amine. In some embodiments, the polyol component can also comprise another type of polyol which is a non-amine-initiated polyol. Each polyol type may include one kind of polyol. Alternatively, each polyol type may include mixtures of different kinds of polyols. In some embodiments, one polyol type may be one kind of polyol whereas the other polyol type may be a mixture of different kinds of polyols.

The amine-initiated polyol comprises primary hydroxyl groups and a backbone incorporating at least one tertiary amine. In some embodiments, the amine-initiated polyol has the chemical structure of I:

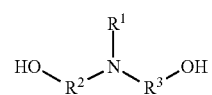

I wherein $R^1$, $R^2$, and $R^3$ are each independently a linear or branched alkyl group. For instance, can each independently be a $C_1$-$C_6$ linear or branched alkyl group. In some embodiments, the amine-initiated polyol comprises tertiary amines and secondary amines.

The amine-initiated polyol comprises a functionality of from 2 to 12, or from 3 to 10, or from 4 to 8. As used with respect to the polyol component, "functionality" refers to the number of isocyanate reactive sites per molecule. Further, the amine-initiated polyol comprises a hydroxyl number of from 5 to 1,830, or from 20 to 100, or from 31 to 40. As used with respect to the polyol component, "hydroxyl number" is a measure of the amount of reactive hydroxyl groups available for reaction. This number is determined in a wet analytical method and is reported as the number of milligrams of potassium hydroxide equivalent to the hydroxyl groups found in one gram of the sample. The most commonly used methods to determine hydroxyl number are described in ASTM D 4274 D. Still further, the amine-initiated polyol comprises a viscosity at 25° C. of from 500 to 20,000 mPa-s, or from 1,000 to 15,000 mPa-s, or from 1,500 to 10,000 mPa-s.

Amine-initiated polyols suitable for use according to this disclosure are made by alkoxylating one or more amine initiators with one or more alkylene oxides.

The amount of the amine-initiated polyol in the adhesive composition is, by weight based on the weight of the adhesive composition (i.e., the total weight of the isocyanate component and the polyol component), at least 2 wt %, or at least 10 wt %, or at least 20 wt %. The amount of the at least one amine-initiated polyol in the adhesive composition is, by weight based on the weight of the adhesive composition, not to exceed 100 wt %, or not to exceed 95 wt %, or not to exceed 90 wt %.

Silicone-Based Additive

In some embodiments, the polyol component further comprises a silicone-based additive. In some embodiments, the silicone-based additive is an anti-foaming agent, or defoamer. In some embodiments, the silicone-based additive is wetting agent. In some embodiments, the polyol component comprises only an anti-foaming agent. In some embodiments, the polyol component comprises only a wetting agent. In some embodiments, the polyol component comprises both an anti-foaming agent and a wetting agent. It is thought that inclusion of a silicone-based additive enhances wettability and reduces air entrapment issues encountered with traditional solventless laminating adhesives.

The amount of the silicone-based additive in the adhesive composition is, by weight based on the weight of the polyol component, at least 0.05 wt %, or at least 0.1 wt %, or at least 0.2 wt %. The amount of the silicone-based additive in the adhesive composition is, by weight based on the weight of the polyol component, not to exceed 1 wt %, or not to exceed 0.5 wt %, or not to exceed 0.3 wt %.

Commercially-available examples of silicone-based additives suitable for use according to this disclosure include AF9000 NE™, SAG, 100™, SAG 5693™ from Momentive, BYK 307™ from BYK Additives and Instruments, and DC 163™, ACP 1500™, DC 71™, and DC 74™ from Dow Corning.

Optional Additives

In some embodiments, a non-amine-initiated polyol may optionally be included in the adhesive composition, e.g., in the polyol component. Examples of the non-amine-initiated polyol include, but are not limited to, polyester polyols, polyether polyols, polycarbonate polyols, polyacrylate polyols, polycaprolactone polyols, polyolefin polyols, natural oil polyols, and combinations of two or more thereof. Preferably, the non-amine-initiated polyol has viscosity at 25° C. of from 30 to 40,000 mPa-s, or from 50 to 30,000 mPa-s, or from 70 to 20,000 mPa-s, as measured by the method of ASTM D2196. Preferably, the non-amine-initiated polyol has viscosity of 100 to 10,000 mPa-s at 25° C., as measured by the method of ASTM D2196.

The amount of the non-amine-initiated polyol in the adhesive composition is at least 0 wt %, or at least 5 wt %, or at least 10 wt %. The amount of the non-amine-initiated polyol in the adhesive composition is not to exceed 98 wt %, or not to exceed 90 wt %, or not to exceed 80 wt %.

In some embodiments, an additive can optionally be included in the adhesive composition. Examples of such additives include, but are not limited to, tackifiers, plasticizers, rheology modifiers, adhesion promoters, antioxidants, fillers, colorants, surfactants, solvents, and combinations of two or more thereof.

Laminate Formation

It is contemplated that the isocyanate component and the polyol component of the disclosed solventless adhesive composition are formulated separately and stored until it is desired to form a laminate structure. Preferably, the isocyanate component and polyol component are in a liquid state at 25° C. Even if the components are solid at 25° C., it is acceptable to heat the components as necessary to put them into a liquid state. As the pot-life of the adhesive composition is decoupled from the curing process, the components can be stored indefinitely.

A laminate comprising the disclosed adhesive compositions can be formed by applying the isocyanate and polyol components of the adhesive composition separately to two different substrates, such as two films. As used herein, a "film" is any structure that is 0.5 mm or less in one dimension and is 1 cm or more in both of the other two dimensions. A "polymer film" is a film that is made of a polymer or mixture of polymers. The composition of a polymer film is, typically, 80 percent by weight or more by weight one or more polymers.

For instance, a layer of the isocyanate component is applied to a surface of a first substrate. Preferably, the thickness of the layer of the isocyanate component on the first substrate is from 0.5 to 2.5 µm. A layer of the polyol component is applied to a surface of a second substrate. Preferably, the thickness of the layer of the polyol component on the second substrate is from 0.5 to 2.5 µm. By controlling the thickness of the layers applied to each substrate, the ratio of the components can be controlled. In some embodiments, the mix ratio of the isocyanate component to the polyol component in the final adhesive composition can be 100:100, or 100:90, or 100:80. The disclosed adhesive compositions are more forgiving than traditional adhesives and can accommodate some coating weight error (e.g., up to about 10% coating weight error).

The surfaces of the first and second substrates are then run through a device for applying external pressure to the first and second substrates, such as nip roller. Bringing the isocyanate component and polyol component together forms a curable adhesive mixture layer. When the surfaces of the first and second substrates are brought together, the thickness of the curable adhesive mixture layer is 1 to 5 µm. The isocyanate component and polyol component begin mixing and reacting when the first and second substrates are brought together and the components come into contact with each other. This marks the beginning of the curing process.

Further mixing and reacting is accomplished as the first and second substrates are run through various other rollers and ultimately to a rewind roller. The further mixing and reacting occurs as the first and second substrates pass through rollers because the substrates each take longer or shorter paths than the other substrate across each roller. In this way, the two substrates move relative to one another, mixing the components on the respective substrates. Arrangements of such rollers in an application apparatus are commonly known in the art. The curable mixture is then cured or allowed to cure.

The highest lamination speeds achieved on conventional laminators when using PET printed or unprinted with aluminum foil substrates are typically from 150 to 200 m/min. When using the disclosed adhesive compositions, lamination speeds of equal to or greater than 200 m/min, for instance from 200 to 250 m/min, are achievable. The highest lamination speeds achieved on conventional laminators when using PET printed or unprinted with metallized PET substrates are typically from 200 to 250 m/min. When using the disclosed adhesive compositions, lamination speeds of equal to or greater than 250 m/min, for instance from 250 to 300 m/min, are achievable.

Suitable substrates in the laminate structure include films such as paper, woven and nonwoven fabric, polymer films, metal foil, and metal-coated (metallized) polymer films. Some films optionally have a surface on which an image is printed with ink which may be in contact with the adhesive composition. The substrates are layered to form a laminate structure, with an adhesive composition according to this disclosure adhering one or more of the substrates together.

EXAMPLES OF THE DISCLOSURE

The present disclosure will now be explained in further detail by describing examples illustrating the disclosed adhesive compositions and existing adhesive compositions (Illustrative Examples "IE", Comparative Examples "CE", collectively, "the Examples"). However, the scope of the present disclosure is not, of course, limited to the Examples.

The Examples are prepared using the raw materials identified in Table 1.

TABLE 1

| Raw Materials | | | |
|---|---|---|---|
| Matrix | Description | Characteristics | Supplier |
| SYMBIEX™ CR001 | Polyol | OH number (mg KOH/g) = 134; Viscosity (mPa-s, 25° C.) = 15,000 | The Dow Chemical Company |

TABLE 1-continued

| Raw Materials | | | |
|---|---|---|---|
| Matrix | Description | Characteristics | Supplier |
| SYMBIEX™ 100 | Aromatic polyisocyanate (MDI-based) | % NCO = 13.50; Viscosity (mPa-s, 25° C.) = 11,000 | The Dow Chemical Company |
| MOR-FREE™ 403A | Isocyanate-terminated component (MDI-based) | % NCO = 17.9%; Viscosity (mPa-s, 25° C.) = 1,700 | The Dow Chemical Company |
| MOR-FREE™ C-117 | OH-terminated component | OH number (mg KOH/g) = 180; Viscosity (mPa-s, 25° C.) = 4,500 | The Dow Chemical Company |
| AF9000 NE™ | Silicone-based anti-foaming agent | Silicone/silica content, % = 100; Viscosity (mPa-s, 25° C.) = 2,500 | Momentive |
| SAG 100™ | Silicone-based anti-foaming agent | Viscosity (mPa-s, 25° C.) = 1,500 | Momentive |
| SAG 5693™ | Silicone-based anti-foaming agent | Viscosity (mPa-s, 25° C.) = 350 | Momentive |
| BYK 307™ | Silicone-based wetting agent | Polyether-modified polydimethylsiloxane | BYK Additives and Instruments |
| DC 163™ | Silicone-based anti-foaming agent | Polydimethylsiloxane and silica (reacted) | Dow Corning |
| ACP 1500™ | Silicone-based anti-foaming agent | Silicone/silica content, % = 100 | Dow Corning |
| DC 71™ | Silicone-based wetting agent | Orango-modified silicone copolymer with silicone backbone and ED/PO groups | Dow Corning |
| DC 74™ | Silicone-based wetting agent | Organo-modified silicone copolymer with silicone backbone and ED/PO groups | Dow Corning |

Laminate structures comprising the adhesive systems described in Table 2 are prepared on a Nordmeccanica DUPLEX ONE-SHOT™ laminator having the following machine parameters: temperature at dosing gap of 45° C.; temperature at application roll of 55° C.; temperature at nip roll of 55° C.; nip pressure of 2.5 N; lay-on pressure of 1.5 N; rewind tension of 160 N; hardness at nip roll of 90 shore. As indicated in Table 2, the OH Component (i.e., the polyol component) is applied to the Laminate OH Part, and the NCO Component (i.e., the isocyanate component) is applied to the Laminate NCO Part prior to the substrates being brought together for lamination.

TABLE 2

| Examples Prepared with Aluminum Foil Substrates | | | | | |
|---|---|---|---|---|---|
| Example | OH Component | Laminate OH Part | NCO Component | Laminate NCO Part | Maximum lamination speed (m/min) for good optics/observations |
| CE1 | SYMBIEX™ CR 001 | Aluminum | SYMBIEX™ 100 | Unprinted PET | 250 m/min: good optics |
| CE2 | SYMBIEX™ CR 001 | Aluminum | SYMBIEX™ 100 | Full printed PET | Less than 150 m/min. Defects observed |

TABLE 2-continued

Examples Prepared with Aluminum Foil Substrates

| Example | OH Component | Laminate OH Part | NCO Component | Laminate NCO Part | Maximum lamination speed (m/min) for good optics/observations |
|---|---|---|---|---|---|
| CE3 | SYMBIEX™ CR 001 | Aluminum | SYMBIEX™ 100 | Printed PET window | Less than 150 m/min. Defects observed |
| CE4 | SYMBIEX™ CR 001 + 0.2% wt DC 71 | Aluminum | SYMBIEX™ 100 | Unprinted PET | 150 m/min: Acceptable. |
| CE5 | SYMBIEX™ CR 001 + 0.2% wt DC 71 | Aluminum | SYMBIEX™ 100 | Full printed PET | 150 m/min: Acceptable. |
| CE6 | SYMBIEX™ CR 001 + 0.2% wt DC 74 | Aluminum | SYMBIEX™ 100 | Full printed PET | 200 m/min: Acceptable. |
| CE7 | SYMBIEX™ CR 001 + 0.2% wt BYK 307 | Aluminum | SYMBIEX™ 100 | Unprinted PET | 150 m/min: Acceptable. |
| CE8 | SYMBIEX™ CR 001 + 0.2% wt BYK 307 | Aluminum | SYMBIEX™ 100 | Full printed PET | 150 m/min: Good optics |
| IE1 | SYMBIEX™ CR 001 + 0.2% wt DC 163 | Aluminum | SYMBIEX™ 100 | Unprinted PET | 300 to 350 m/min: Good optics. |
| IE2 | SYMBIEX™ CR 001 + 0.2% wt DC 163 | Aluminum | SYMBIEX™ 100 | Full printed PET | 250 m/min: Good optics |
| IE3 | SYMBIEX™ CR 001 + 0.2% wt DC 163 | Aluminum | SYMBIEX™ 100 | Printed PET window | 150 m/min: Good optics |
| IE4 | SYMBIEX™ CR 001 + 0.2% wt AF9000NE | Aluminum | SYMBIEX™ 100 | Unprinted PET | 350 m/min: Good optics |
| IE5 | SYMBIEX™ CR 001 + 0.2% wt AF9000NE | Aluminum | SYMBIEX™ 100 | Full printed PET | 300 m/min: Good optics |

Laminate structures comprising the adhesive systems described in Table 2 are prepared on a Nordmeccanica DUPLEX ONE-SHOT™ laminator having the following machine parameters: temperature at dosing gap of 45° C.; temperature at application roll of 55° C.; temperature at NIP roll of 55° C.; nip pressure of 2.5 N; lay-on pressure of 0.6 N; rewind tension of 120 N; hardness at nip roll of 90 shore. As indicated in Table 3, the OH Component (i.e., the polyol component) is applied to the Laminate OH Part, and the NCO Component (i.e., the isocyanate component) is applied to the Laminate NCO Part prior to the substrates being brought together for lamination.

TABLE 3

Examples Prepared with Metallized PET Substrates

| Example | OH Component | Laminate OH Part | NCO Component | Laminate NCO Part | Maximum lamination speed (m/min) for good optics/observations |
|---|---|---|---|---|---|
| CE9 | SYMBIEX™ CR 001 | Metallized PET | SYMBIEX™ 100 | Unprinted PET | 250 m/min: Good optics |
| CE10 | SYMBIEX™ CR 001 | Metallized PET | SYMBIEX™ 100 | Full printed PET | 250 m/min: Good optics |
| CE11 | SYMBIEX™ CR 001 | Metallized PET | SYMBIEX™ 100 | Printed PET window | Less than 150 m/min. Acceptable optics |

TABLE 3-continued

Examples Prepared with Metallized PET Substrates

| Example | OH Component | Laminate OH Part | NCO Component | Laminate NCO Part | Maximum lamination speed (m/min) for good optics/observations |
|---|---|---|---|---|---|
| CE12 | SYMBIEX™ CR 001 + 0.2% wt BYK 307 | Metallized PET | SYMBIEX™ 100 | Unprinted PET | 250 m/min Good optics |
| CE13 | SYMBIEX™ CR 001 + 0.2% wt BYK 307 | Metallized PET | SYMBIEX™ 100 | Full printed PET | 250 m/min Good optics |
| IE6 | SYMBIEX™ CR 001 + 0.2% wt DC 163 | Metallized PET | SYMBIEX™ 100 | Unprinted PET | 350 m/min: Good optics |
| IE7 | SYMBIEX™ CR 001 + 0.2% wt DC 163 | Metallized PET | SYMBIEX™ 100 | Full printed PET | 350 m/min: Good optics |
| IE8 | SYMBIEX™ CR 001 + 0.2% wt DC 163 | Metallized PET | SYMBIEX™ 100 | Printed PET window | 300 m/min: Good optics |
| IE9 | SYMBIEX™ CR 001 + 0.2% wt AF9000NE | Metallized PET | SYMBIEX™ 100 | Unprinted PET | 300 m/min Good optics |
| IE10 | SYMBIEX™ CR 001 + 0.2% wt AF9000NE | Metallized PET | SYMBIEX™ 100 | Full printed PET | 300 m/min: Good optics |
| IE11 | SYMBIEX™ CR 001 + 0.2% wt DC 71 | Metallized PET | SYMBIEX™ 100 | Unprinted PET | 300 m/min Good optics |
| IE12 | SYMBIEX™ CR 001 + 0.2% wt DC 71 | Metallized PET | SYMBIEX™ 100 PET | Full printed | 300 m/min: Good optics |
| IE13 | SYMBIEX™ CR 001 + 0.2% wt DC 74 | Metallized PET | SYMBIEX™ 100 | Full printed PET | 350 m/min: Good optics |
| IE14 | SYMBIEX™ CR 001 + 0.2% wt SAG100 | Metallized PET | SYMBIEX™ 100 | Unprinted PET | 350 m/min Good optics |
| IE15 | SYMBIEX™ CR 001 + 0.2% wt ACP1500 | Metallized PET | SYMBIEX™ 100 | Unprinted PET | 350 m/min Good optics |

Still further, when silicone-based additives, like DC 163™, AF9000 NE™ and DC 71™, are incorporated into conventional two-component polyurethane laminating adhesives (i.e., pre-mixed systems), the results showed that additives did not improve the laminate appearance. This is in contrast to the Illustrative Examples described in Tables 2 and 3 using the DUPLEX ONE-SHOT™ laminator which showed beneficial results using silicone-based additives. In particular, the addition of a silicone-based additive, such as an anti-foaming agent and/or a wetting agent, at a concentration between 0.05 to 0.5 weight percent provided for increased lamination speed of metalized barrier structures.

In addition to the embodiments described above, many embodiments of specific combinations are within the scope of the disclosure, some of which are described below:

Embodiment 1. A two-component solventless adhesive composition, comprising:

an isocyanate component comprising an isocyanate; and
a polyol component comprising:
  an amine-initiated polyol comprising two or more primary hydroxyl groups and a backbone incorporating tertiary amines, wherein the amine-initiated polyol comprises a functionality of from 2 to 12, a hydroxyl number of from 5 to 1,830, and a viscosity at 40° C. of from 500 to 20,000 mPa-s; and
  a silicone-based additive.

Embodiment 2. The two-component solventless adhesive composition according to any preceding or succeeding Embodiment, wherein the silicone-based additive is an anti-foaming agent.

Embodiment 3. The two-component solventless adhesive composition according to any preceding or succeeding Embodiment, wherein the anti-foaming agent comprises up to 100 percent by weight silicone/silica.

Embodiment 4. The two-component solventless adhesive composition according to any preceding or succeeding Embodiment, wherein the silicone-based additive is a wetting agent.

Embodiment 5. The two-component solventless adhesive composition according to any preceding or succeeding Embodiment, wherein the wetting agent comprises a polyether-modified polydimethylsiloxane.

Embodiment 6. The two-component solventless adhesive composition according to any preceding or succeeding Embodiment, wherein the silicone-based additive is selected from the group consisting of an anti-foaming agent, a wetting agent, and combinations thereof.

Embodiment 7. The two-component solventless adhesive composition according to any preceding or succeeding Embodiment, wherein the isocyanate component is adapted for application to a first substrate and the polyol component is adapted for application to a second substrate.

Embodiment 8. The two-component solventless adhesive composition according to any preceding or succeeding Embodiment, wherein the adhesive composition comprising a viscosity greater than 10,000 mPa-s (at 40° C.) within 10 minutes of mixing the isocyanate component and polyol component.

Embodiment 9. A two-component solventless adhesive composition, comprising:
an isocyanate component comprising an isocyanate; and
a polyol component comprising:
an amine-initiated polyol comprising two or more primary hydroxyl groups and a backbone incorporating tertiary amines, wherein the amine-initiated polyol comprises a functionality of from 2 to 12, a hydroxyl number of from 5 to 1,830, and a viscosity at 40° C. of from 500 to 20,000 mPa-s; and
an anti-foaming agent.

Embodiment 10. A two-component solventless adhesive composition, comprising:
an isocyanate component comprising an isocyanate; and
a polyol component comprising:
an amine-initiated polyol comprising two or more primary hydroxyl groups and a backbone incorporating tertiary amines, wherein the amine-initiated polyol comprises a functionality of from 2 to 12, a hydroxyl number of from 5 to 1,830, and a viscosity at 40° C. of from 500 to 20,000 mPa-s; and
a wetting agent.

Embodiment 11. A two-component solventless adhesive composition, comprising:
an isocyanate component comprising an isocyanate; and
a polyol component comprising:
an amine-initiated polyol comprising two or more primary hydroxyl groups and a backbone incorporating tertiary amines, wherein the amine-initiated polyol comprises a functionality of from 2 to 12, a hydroxyl number of from 5 to 1,830, and a viscosity at 40° C. of from 500 to 20,000 mPa-s;
an anti-foaming agent; and
a wetting agent.

Embodiment 12. A two-component solventless adhesive composition, comprising:
an isocyanate component adapted for application to a first substrate and comprising an isocyanate; and
a polyol component adapted for application to a second substrate and comprising:
an amine-initiated polyol comprising primary hydroxyl groups and a backbone incorporating tertiary amines; and
a silicone-based additive.

Embodiment 13. The two-component solventless adhesive composition according to any preceding or succeeding Embodiment, wherein the amine-initiated polyol has the structure I:

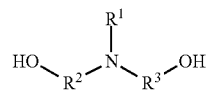

wherein $R^1$, $R^2$, and $R^3$ are independently a linear or branched alkyl group.

Embodiment 14. The two-component solventless adhesive composition according to any preceding or succeeding Embodiment, wherein the amine-initiated polyol comprises a functionality of 4.

Embodiment 15. The two-component solventless adhesive composition according to any preceding or succeeding Embodiment, wherein the amine-initiated polyol comprises a hydroxyl number of 37.

Embodiment 16. The two-component solventless adhesive composition according to any preceding or succeeding Embodiment, wherein the amine-initiated polyol comprises a viscosity at 25° C. of about 1,200 mPa-s.

Embodiment 17. The two-component solventless adhesive composition according to any preceding or succeeding Embodiment, wherein the amine-initiated polyol comprise a molecular weight of about 6,000 g/mol.

Embodiment 18. The two-component solventless adhesive composition according to any preceding or succeeding Embodiment, wherein the ratio by weight of isocyanate component to polyol component is from 0.5:1 to 1.5:1.

Embodiment 19. The two-component solventless adhesive composition according to any preceding or succeeding Embodiment, wherein the isocyanate component comprises less than about 50% monomer content.

Embodiment 20. The two-component solventless adhesive composition according to any preceding or succeeding Embodiment, wherein the isocyanate component comprises a viscosity at 40° C. from 500 to 10,000 mPa-s.

Embodiment 21. The two-component solventless adhesive composition according to any preceding or succeeding Embodiment, wherein the at least one polyisocyanate is selected from the group consisting of 4, 4-methylene diphenyl diisocyanate ("MDI"), 2,4'-MDI, 2,2'-MDI, 2,4-toluenediisocyanate ("TDI"), 2,6-TDI, isomers of hexamethylene diisocyanate ("HDI"), and combinations of two or more thereof.

Embodiment 22. A laminate structure comprising the two-component solventless adhesive composition according to any preceding or succeeding Embodiment.

Embodiment 23. A laminate structure comprising:
the two-component solventless adhesive composition according to any preceding or succeeding Embodiment; and
a substrate comprising a metal foil substrate.

Embodiment 24. A laminate structure comprising:
the two-component solventless adhesive composition according to any preceding or succeeding Embodiment; and
a substrate comprising a metal-coated polymer film.

Embodiment 25. The two-component solventless adhesive composition according to any preceding or succeeding Embodiment, wherein the silicone-based additive is present from 0.05 to 1 percent by weight, by weight based on the weight of the polyol component.

Embodiment 26. The two-component solventless adhesive composition according to any preceding or succeeding Embodiment, wherein the silicone-based additive is present from 0.1 to 0.5 percent by weight, by weight based on the weight of the polyol component.

Embodiment 27. The two-component solventless adhesive composition according to any preceding or succeeding Embodiment, wherein the silicone-based additive is present from 0.2 to 0.3 percent by weight, by weight based on the weight of the polyol component.

That which is claimed is:

1. A two-component solventless adhesive composition, comprising:
   (A) an isocyanate component consisting of an isocyanate and an optional polyol; and
   (B) a polyol component comprising
      (i) from 2 wt % to 10 wt % of an amine-initiated polyol comprising two or more primary hydroxyl groups and a backbone incorporating a plurality of tertiary amines and having the Structure I,

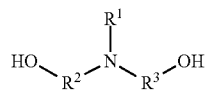

I wherein $R^1$ is a $C_1$ alkyl group and $R^2$ and $R^3$ are independently a linear or branched alkyl group, and the amine-initiated polyol has
   a functionality from 4 to 8,
   a hydroxyl number from 31 to 40, and
   a viscosity at 40° C. of from 500 to 20,000 mPa·s;
      (ii) a plurality of non-amine-initiated polyols comprising
         (a) a polyether polyol, and
         (b) a polyester polyol
      (iii) from 0.05 wt % to 0.2 wt % of a silicone-based additive; and
   weight percent is based on the total weight of the adhesive composition.

2. The two-component solventless adhesive composition according to claim 1, wherein the silicone-based additive is an anti-foaming agent.

3. The two-component solventless adhesive composition according to claim 2, wherein the anti-foaming agent comprises up to 100 percent by weight silicone or silica.

4. The two-component solventless adhesive composition according to claim 1, wherein the silicone-based additive is a wetting agent.

5. The two-component solventless adhesive composition according to claim 4, wherein the wetting agent comprises a polyether-modified polydimethylsiloxane.

6. The two-component solventless adhesive composition according to claim 1, wherein the silicone-based additive is selected from the group consisting of an anti-foaming agent, a wetting agent, and combinations thereof.

7. The two-component solventless adhesive composition according to claim 1, wherein the ratio by weight of isocyanate component to polyol component is from 0.5:1 to 1.5:1.

8. The two-component solventless adhesive composition of claim 1 wherein the isocyanate component (A) consists of one or more isocyanates.

9. A laminate structure comprising:
   a two-component solventless adhesive composition, comprising
   (A) an isocyanate component consisting of an isocyanate and an optional polyol; and
   (B) a polyol component comprising
      (i) an amine-initiated polyol comprising two or more primary hydroxyl groups and a backbone incorporating a plurality of tertiary amines, and having the Structure I,

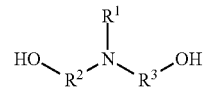

I wherein $R^1$ is a $C_1$ alkyl group, and $R^2$ and $R^3$ are independently a linear or branched alkyl group, and the amine-initiated polyol has
   a functionality from 4 to 8,
   a hydroxyl number from 31 to 40, and
   a viscosity at 40° C. of from 500 to 20,000 mPa·s;
      (ii) a plurality of non-amine-initiated polyols comprising
         (a) a polyether polyol, and
         (b) a polyester polyol;
      (iii) from 0.05 wt % to 0.2 wt % of a silicone-based additive; and
   a metal or metallized substrate.

* * * * *